(12) United States Patent
Ditzler et al.

(10) Patent No.: US 10,860,190 B1
(45) Date of Patent: Dec. 8, 2020

(54) PRESENTING AND INTERACTING WITH COMPOSITE IMAGES ON A COMPUTING DEVICE

(71) Applicant: Amazon Technologies, Inc., Seattle, WA (US)

(72) Inventors: Nicholas Robert Ditzler, Bellevue, WA (US); Lee David Thompson, Normandy Park, WA (US); Devesh Sanghvi, Seattle, WA (US); Hilit Unger, Even-Yehuda (IL); Moshe Bouhnik, Holon (IL); Siddharth Jacob Thazhathu, Seattle, WA (US); Anton Fedorenko, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/390,689

(22) Filed: Apr. 22, 2019

(51) Int. Cl.
*G06F 3/048* (2013.01)
*G06F 3/0484* (2013.01)
(Continued)

(52) U.S. Cl.
CPC ........ *G06F 3/04845* (2013.01); *G06F 3/0482* (2013.01); *G06F 3/0485* (2013.01); *G06F 3/04883* (2013.01); *G06F 2203/04803* (2013.01)

(58) Field of Classification Search
CPC .. G06F 16/583; G06F 16/5838; G06F 3/0482; G06F 16/532; G06F 3/0481; G06F 16/51; G06F 16/24578; G06F 16/50; G06F 16/5854; G06F 16/5866; G06F 3/04842; G06F 11/2082; G06F 16/54; G06F 16/55; G06F 16/58; G06F 16/60; G06F 16/63; G06F 3/04817; G06F 3/0484; G06F 3/0485; G06F 9/542; G06F 16/113; G06F 16/27; G06F 16/285; G06F 16/3322;
(Continued)

(56) References Cited

U.S. PATENT DOCUMENTS

| 2013/0330062 | A1* | 12/2013 | Meikle | H04N 9/87 386/285 |
| 2017/0262959 | A1* | 9/2017 | Lee | G06T 3/0068 |
| 2017/0287060 | A1* | 10/2017 | Choi | G06F 3/002 |

OTHER PUBLICATIONS

Bouhnik et al., U.S. Appl. No. 15/919,118, "Method and System for Generating Combined Images Utilizing Image Processing of Multiple Images," filed Mar. 12, 2018, 46 pages.

* cited by examiner

*Primary Examiner* — Di Xiao
(74) *Attorney, Agent, or Firm* — Kilpatrick Townsend & Stockton LLP

(57) ABSTRACT

Techniques for presenting and interacting with composite images on a computing device are described. In an example, the device presents a first article and a first portion of a first composite image showing a second article. The first composite image shows a first outfit combination that is different from the first outfit. The device receives a first user interaction indicating a request to change the second article and presents the first article and a second portion of a second composite image showing a clothing article in a second outfit. The second composite image shows a second outfit combination that is different from the first outfit, the second outfit, and the first outfit combination. The device receives a second user interaction indicating a request to use the third article and presents the second composite image showing the second outfit combination.

20 Claims, 10 Drawing Sheets

(51) Int. Cl.
*G06F 3/0482* (2013.01)
*G06F 3/0485* (2013.01)
*G06F 3/0488* (2013.01)

(58) Field of Classification Search
CPC .............. G06F 16/3328; G06F 16/951; G06F 16/9535; G06F 16/958; G06F 3/011; G06F 3/017; G06F 3/048; G06F 3/04847; G06F 3/0488; G06F 3/04883; G06F 3/167; G06F 13/4081; G06F 16/2228; G06F 16/2455; G06F 16/248; G06F 16/538; G06F 16/972; G06F 19/321; G06F 1/1626; G06F 21/55; G06F 21/6245; G06F 2203/04104; G06F 3/013; G06F 3/0416; G06F 3/0418; G06F 3/042; G06F 3/0425; G06F 3/0426; G06F 3/0428; G06F 3/04815; G06F 3/1204; G06F 3/1205; G06F 3/121; G06F 3/1213; G06F 3/1221; G06F 3/1226; G06F 3/1237; G06F 3/124; G06F 3/126; G06F 3/1261; G06F 3/1267; G06F 3/1285; G06F 3/1292; G06F 3/1423; G06F 40/205; G06F 40/44; G06F 1/1686

See application file for complete search history.

PRESENTING AND INTERACTING WITH COMPOSITE IMAGES ON A COMPUTING DEVICE

BACKGROUND

Computing devices are commonly used to capture and process image data. In an example, a user operates a computing device to browse images stored on a server. The computing device can download the images for local storage. The browsing generally supports scrolling between images and viewing each of the images individually.

To illustrate, consider an example of images of a user uploaded to a server. These images can be organized based on the upload date. By operating a computing device, the user can view the images of themselves. For instance, small resolution versions of the images are organized in a tile arrangement. Upon a selection of one of the tiles, the corresponding image can be presented at a higher resolution. Thereafter, the user can scroll to the next image.

BRIEF DESCRIPTION OF THE DRAWINGS

Various embodiments in accordance with the present disclosure will be described with reference to the drawings, in which.

DETAILED DESCRIPTION

Figure 1:
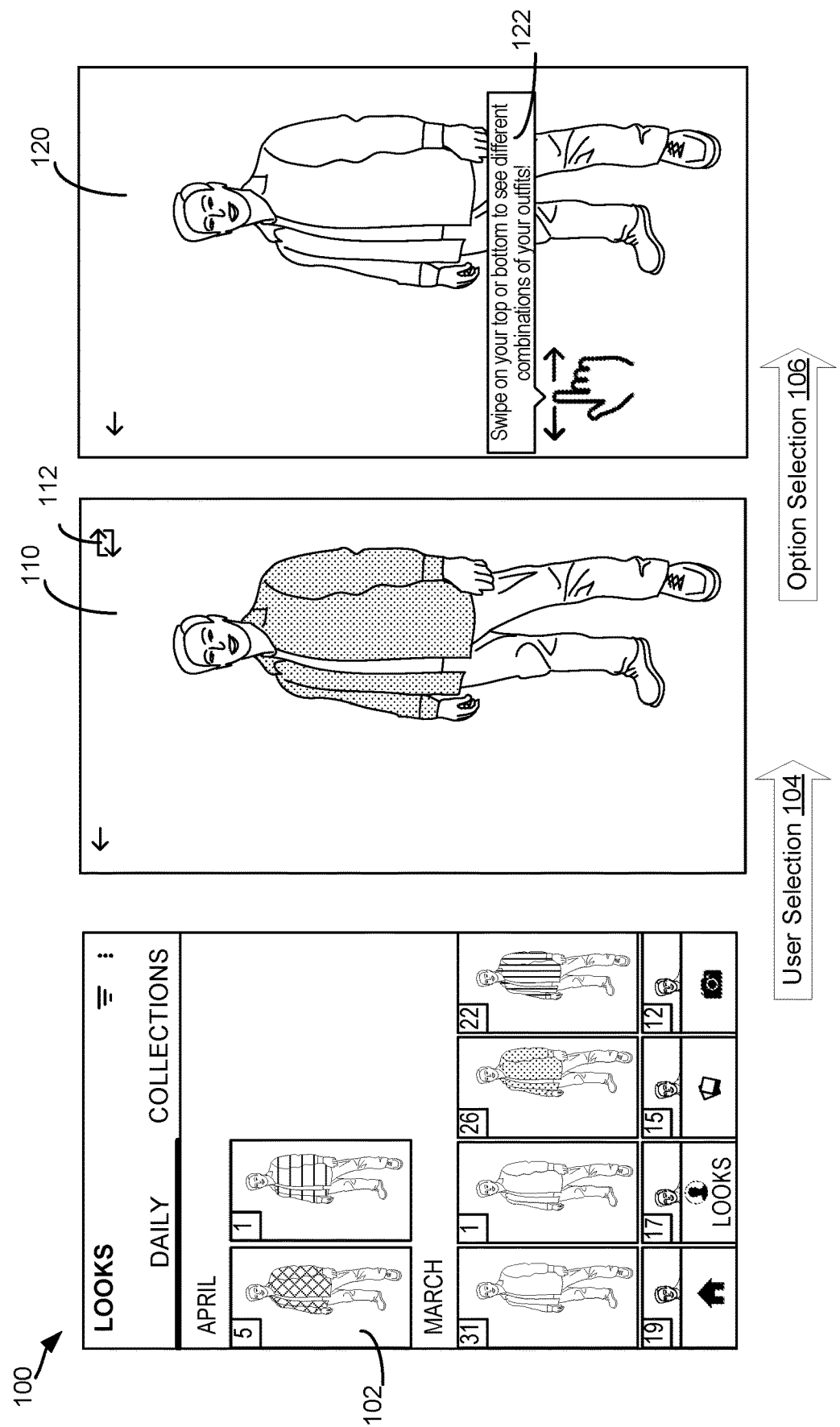
FIG. 1 illustrates an example of a graphical user interface (GUI) for selecting a source image, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed, among other things, to presenting and interacting with composite images on a computing device. In an example, a composite image may be generated based on multiple source images. A first portion of the composite image may correspond to a first portion of a first source image. Similarly, a second portion of the composite image may correspond to a second portion of a second source image. In this way, the composite image may represent a combination of different portions from different source images. Upon a presentation of one of the source images (e.g., the first source image) on a graphical user interface (GUI), an option may also be presented to view composite images associated with this source image. Upon a user selection of this option, the composite image may be presented. Thereafter, one of the presented portions of the composite image (e.g., the first portion) may be used as an anchor to view other associated composite images that also contain the anchored portion. For instance, upon a user interaction with the second portion, the second portion can be replaced on the GUI with a third portion from a second composite image, where this composite image was generated based on the first source image, contains the first portion (e.g., the anchor), and contains the third portion that originated from a third source image. Upon a user selection of the second composite image, the GUI may transition the presentation to presenting the second composite image in full. Of course, prior to the anchoring, a user may interact with multiple portions of the associated composite images while using the anchor. And after the transition, the user can restart the interaction process by changing the anchor.

To illustrate, consider an example of using a smartphone that hosts a "looks application." The looks application may be configured to present images of a user in different clothing outfits organized in a virtual closet, such that the user can browse through their virtual closet. In this example, looks application may drive a GUI that presents a source image captured by an imaging device and showing an outfit previously worn by the user. For instance, the source image shows blue jeans with a red shirt. The GUI may also present an option to view composite images that would show outfit combinations of either the blue jeans with other shirts or the red shirt with other pants. The outfit combinations may represent outfits that the user has not previously worn (or at least have not previously uploaded images thereof) and that are associated with the source image (e.g., each generated in part from the source image to show either the blue jeans or the red shirt). Upon a user selection of the option, a first composite image is presented showing an outfit combination that includes the blue jeans and a white shirt (where the blue jeans portion of this image originated from the source image and the white shirt portion of this image originated from another source image). By using the blue jeans image portion as an anchor in the bottom portion of the GUI, user swipes over the top portion of the GUI would result in a scroll through top portions of other composite images showing other possible shirts in outfit combinations with the blue jeans (e.g., where these images are also generated in part from the source image to include the blue jeans portion). Hence, while the presentation of the blue jeans from the first composite image continues in the bottom portion of the GUI, a first scroll may show a brown shirt from a second composite image in the top portion of the GUI, a next scroll may show a yellow shirt from a third composite image in the top portion of the GUI, and so on and so forth. Upon a user selection of a particular shirt (e.g., the yellow shirt), the presentation is updated to fully view the corresponding composite image (e.g., the third composite image is presented in the GUI, showing the blue jeans from this image in the bottom portion of the GUI and the yellow shirt from this image in the top portion of the GUI). The user can then save this composite image to their virtual library and/or share this image over a social media feed.

Embodiments of the present disclosure provide many technical advantages over existing systems for browsing and interacting with images. For example, a richer browsing and interaction experience may be possible because multiple composite images can be browsed based on their association with a source image. The browsing may include mixing the presentation of two or more composite images until a user selection to then present the relevant composite image. In addition, and as further described herein below, the composite images and the associated metadata may be stored locally on the computing device, thereby enabling a more responsive GUI. Further, the number of composite images to be received and stored by the computing device can be optimized to reduce the memory storage requirements and network bandwidth, while also maintaining the rich user experience.

In the interest of clarity of explanation, embodiments of the present disclosure are described in connection with images of outfits that include clothing articles. However, the embodiments are not limited as such. Instead, the embodiments similarly apply to presenting and interaction with composite images. Generally, a composite image may be generated from two or more source images, such that each portion of the composite image corresponds to a portion from a source image. Metadata of the composite image may identify its respective portions and may be used to associate it with the corresponding source images. Upon a presentation of one of these source images, the composite image may also be presented and one of its portions can be used as an anchor to scroll and view other composite images associated with the presented source image. In addition, the embodiments are not limited to images (source and composite) of clothing articles. Instead, the embodiments similarly apply to images showing combinations of objects. Different types of objects are possible, where generally two or more objects may be used in a combination. For instance, the images may show furniture pieces and may be used to show how a room may look like by combining other furniture pieces. In an illustration, a user may take a photo of their kitchen, where the photo shows a black granite counter-top and an off-white cabinet. Composite images showing other combinations of counter-tops and cabinets may be presented to the user to suggest a kitchen remodel. For instance, the user may anchor the off-white cabinet and scroll through counter-tops made with other materials and/or having other colors.

FIG. 1 illustrates an example of a GUI 100 for selecting a source image 110, according to embodiments of the present disclosure. In an example, the GUI 100 may be presented on a display of a computing device of a user. An application on the computing device, such as a "looks application" may be executed to present the GUI 100.

As illustrated, the GUI 100 may show multiple source images 102. These source images 102 may have been generated by an imaging device, such as a camera integrated with the computing device or that is separate from the computing device. Each of the source images 102 may show the user wearing an outfit that includes multiple clothing articles, such as a top (e.g., an article of clothing over the waist, such as a shirt) and a bottom (e.g., an article of clothing below the waist, such as pants). The source images 102 may be uploaded to a backend system that includes one or more servers. If the imaging device is separate from the computing device, the computing device may download the source images 102 from the backend system.

The application may organize the presentation of the source images 102. For instance, the source images 102 may be organized in a virtual closet that shows the outfits worn by the user depending on the wear date (or the date the source images 102 were generated). Within the virtual closet, each source image may be presented at a low resolution (e.g., as a thumbnail image).

The computing device may receive a user selection 104 of a source image 110 from the source images 102. The type of the user selection 104 may depend on the supported input modality. For instance, if the display is a touchscreen, a finger tap over the corresponding image thumbnail may be received and processed as the user selection 104. Other touch-based interactions are possible. Likewise other input modalities can be supported (e.g., a keyboard, a mouse, or a voice-based interface). In the case of a voice-based interface, a natural language utterance of a user can be processed by a natural language processing system of the computing device and/or the backend system to interpret this utterance as a user selection.

Based on the user selection, the application may present the source image 110 in the GUI 100. For instance, the source image 110 is presented at a higher image resolution relative to its presentation in the virtual closet. In addition, the application may present an option 112 to view outfit combinations. The option 112 can be presented as an icon over close to a corner (or some other location) of the source image 110.

An outfit combination may represent an outfit not previously worn by the user (or at least for which a source image is not available). An outfit combination associated with the source image 110 may include one or more of the clothing articles shown in the source image 110 with another clothing article(s) shown in another source image. For instance, whereas the source image 110 shows a worn outfit that includes a first top and a first bottom (e.g. a plaid shirt and plain jeans), an outfit combination includes either the first top with a second bottom (e.g., the plaid shirt and shorts) or a second top with the first bottom (e.g., a plain shirt and the plain jeans). The outfit combination may be shown in a composite image, where the composite image may be generated based on the source image 110 and on another associated source image. For instance, a composite image showing the outfit combination of the first top with the second bottom (e.g., the plaid shirt and the shorts) is generated based on the source image 110 and a second source image showing a worn outfit that includes the second bottom. In particular, the composite image may be generated to include the top portion of the source image 110 (e.g., the portion showing the plaid shirt) and the bottom portion of the second source image (e.g., the portion showing the shorts).

Upon receiving a user selection of the option 112 (illustrated as an option selection 106), the application may present, in the GUI 100, a composite image 120 associated with the source image 110. In addition, the application may present instructions 122 about user interactions to view the outfit combinations associated with the source image 110. For instance, the instructions 122 inform the user that swipes over the top portion of the GUI 110 would anchor the bottom portion of the composite image 120 (e.g., showing the bottom of an outfit combination) while allowing the user to scroll through top portions of other composite images that include the anchored bottom. Similarly, the instructions 122 inform the user that swipes over the bottom portion of the GUI 110 would anchor the top portion of the composite image 120 (e.g., showing the top of the outfit combination) while allowing the user to scroll through bottom portions of other composite images that include the anchored top. Here, the swipes and scrolls illustrate one particular type of user interactions. As explained herein above, other types of interactions may also be supported depending on the input modality.

Although FIG. 1 illustrates that the presentation of the composite image 120 replaces the presentation of the source image 110 upon the option selection 106, that may not be the case. Instead, upon the option selection 106, the source image 110 may still be presented and may be split between the portion and the bottom portion to allow the anchoring of one portion and the scroll through the other portion.

In addition, and although FIG. 1 and the next figures describe two portions of the GUI 100, where one can be anchored and another one can be scrolled, a different portioning of the GUI 100 is possible. For instance, the GUI 100 may be divided into three or more portions. One or more portions may be anchored, and remaining unanchored portion(s) may be scrolled.

Figure 2:
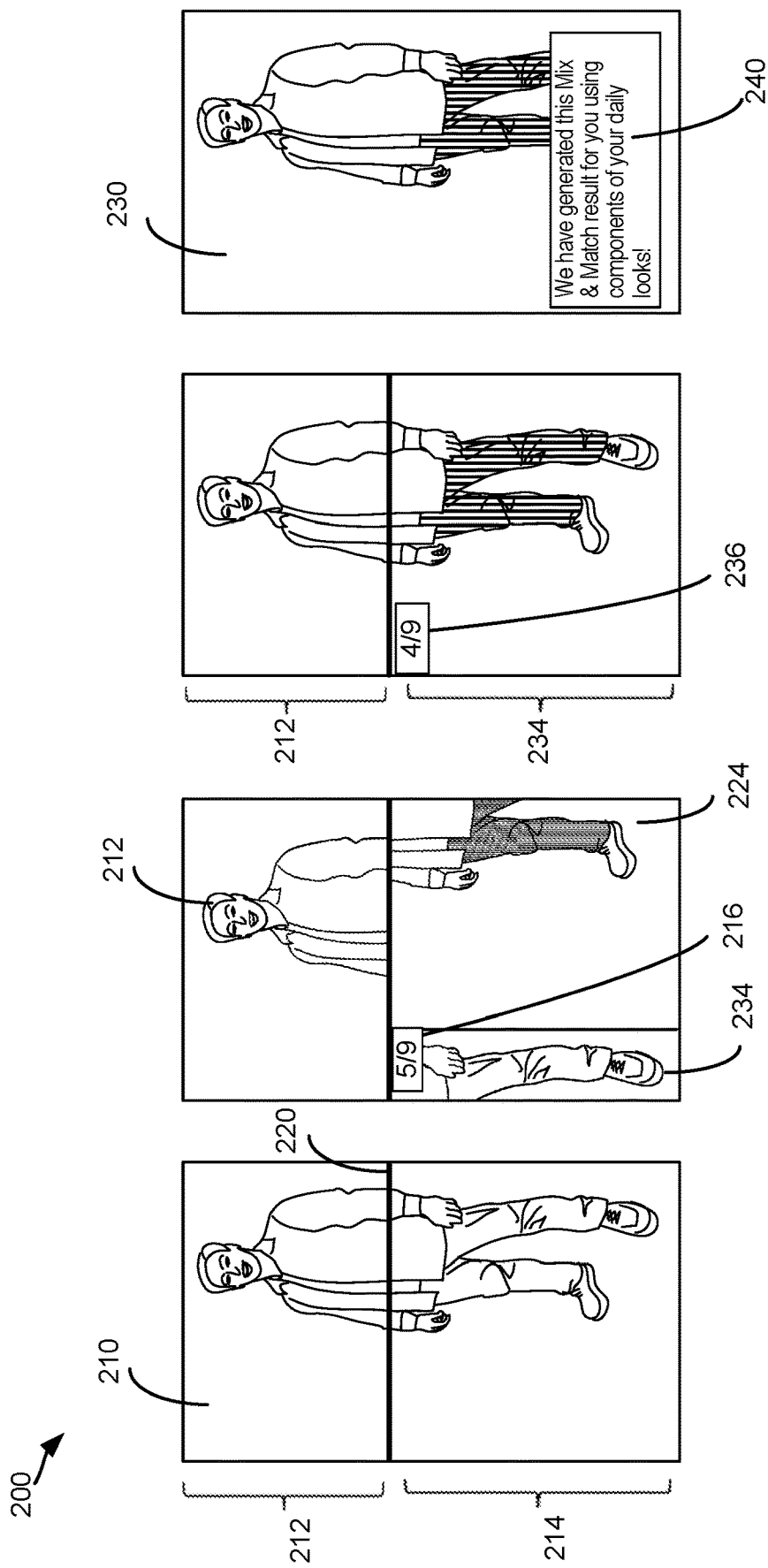
FIG. 2 illustrates an example of a GUI for presenting composite images based on a selected source image, according to embodiments of the present disclosure.

FIG. 2 illustrates an example of a GUI 200 for presenting composite images based on a selected source image, according to embodiments of the present disclosure. The GUI 200 is an example of the GUI 100 and may be presented by the application executing on the computing device.

As illustrated, the GUI 200 may present a composite image 210 that is associated with a source image, for instance. The composite image 210 may include multiple portions, such as a top portion 212 and a bottom portion 214. The top portion may correspond to a top portion of the source image (e.g., be an edited copy thereof), whereas the bottom portion may correspond to a bottom portion of another source image (e.g., be an edited copy thereof). Of course, the composite image 212 may include additional portions corresponding to the same or additional source images. The composite image 210 is an example of the composite image 110 of FIG. 1.

The GUI 200 may show the two portions 212 and 214 of the composite image 210 by separating them with a separation 220. The separation 220 may be a horizontal line across the composite image 210 presented between the bottom of the top portion 212 and the top of the bottom portion 214. In an example, the composite image 212 is divided in halves, each half corresponding to one of the two portions 212 and 214 and the separation 220 may be shown as the centerline. Of course other divisions of the composite image 210 and location of the separation 220 may be possible. Furthermore, the portioning of the composite image 210 may follow the boundaries of clothing article. For instance, the bottom of the top portion may follow the bottom line of the shown shirt. In this case, the separation 220 need not be a horizontal line and may instead be a contour line that follows this boundary. In addition, multiple separations may exist depending on the number of portions of the composite image 210. For instance, if the composite image 210 is divided in three portions, two separations may be used to separate the top portion from the middle portion and the middle portion from the bottom portion.

The separation 220 may be presented to indicate that one of the two portions 212 and 214 may be used as an anchor, while the other portion 214 or 212 may be used for scrolling. As illustrated in FIG. 2, the top portion 212 may be used as an anchor. In response to a user swipe over the bottom portion 214 (or any other type of user interaction depending on the input modality), the GUI 200 may present a transition of the bottom portion 214 to a bottom portion 234 of another composite image 230, while the presentation of the top portion 212 of the composite image 210 continues in the GUI 200. The presented transition can also depend on the input modality. For instance, in association with the user swipe, the transition may be shown as a scroll that brings in the bottom portion 234 into the GUI 200 while the bottom portion 214 is moved out. For an input modality that uses a mouse click, the transition can flash out the bottom portion 214 and flash in the bottom portion 234. At the end of the transition, the GUI 200 may present the top portion 212 of the composite image 210 (used as an anchor) with the bottom portion 234 of the composite image 230, separated by the separation 220.

During the transition (e.g., as the user swipes through bottom portions of composite images), the GUI 200 may present a count of the available composite images that have the anchored portion. For instance, during the transition from the bottom portion 214 to the bottom portion 234, the GUI 200 may present a count 216 indicating that there are nine composite images that show the top anchored portion 212 (e.g., the shirt) and that the bottom portion 214 is from the fifth composite image out of the nine composite images. Likewise, as the bottom portion 234 is transitioned in, the GUI 200 presents a count 236 indicating that this bottom portion 234 is from the fourth composite image out of the nine composite images. In an example, a composite image showing an outfit combination may be associated with a dapperness score indicating a look quality of the outfit combination. In this example, the dapperness score may be presented in addition to or in lieu of the count 236.

The user swipe may continue across multiple composite images that show the anchored top portion and this swipe may be in both directions (e.g., to the right and to the left). Of course, the bottom portion 214 may be similarly anchored and user interactions may be received with top portions.

Once the user swipe ends (e.g., or a user interaction is received indicating a request to show the anchored top portion 212 of the composite image 210 with the bottom portion from another composite image such as the bottom portion 234 of the composite image 230), the GUI 200 may replace the presentation of the composite image 210 with the presentation of the other composite image (e.g., the composite image 230). At that point, the separation 220 may no longer be presented. In addition, the GUI 240 may present a notification 240 indicating that the other composite image 230 is presented and corresponds to a new outfit combination not previously available from a source image.

Hence, when the GUI 100 and GUI 200 are used in conjunction, the user may browse their virtual closet to view source images of themselves wearing outfits. The user may select a source image showing a worn outfit, anchor a shown clothing article (e.g., a top such as a shirt) and browse through composite images showing outfit combinations not previously worn, where these outfit combinations combine the anchored clothing article with other clothing articles. Each composite image would show the user wearing an outfit combination (despite the fact that the user has not actually worn or uploaded a source image showing them as wearing the outfit combination). The composite image would show the anchored clothing article from the source image (e.g., the top) in combination with a clothing article from a second source image (e.g., a bottom). The user may be able to scroll through clothing articles (e.g. bottoms) of new outfit combinations that use the anchored clothing article (top) as shown in bottom portions of the composite images showing the new outfit combinations. Once the user finds an interesting new outfit combination, the corresponding composite image (e.g., the one showing the anchored top with the selected bottom) may be presented and added to the user's virtual closet.

Figure 3:
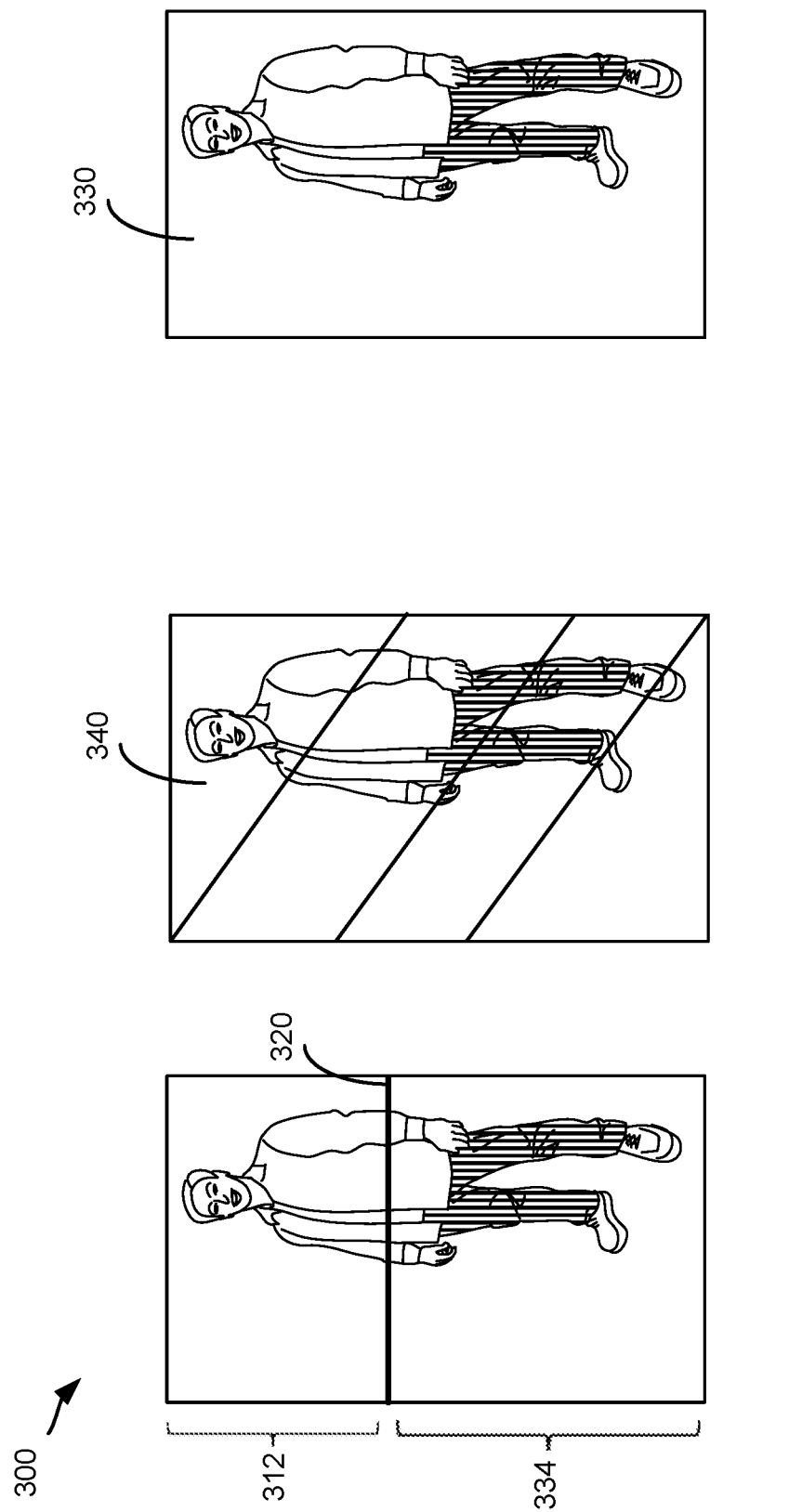
FIG. 3 illustrates an example of a GUI for presenting a transition to a selected composite image, according to embodiments of the present disclosure.

FIG. 3 illustrates an example of a GUI 300 for presenting a transition to a selected composite image, according to embodiments of the present disclosure. The GUI 300 is an example of the GUI 200 and may be presented by the application executing on the computing device.

As illustrated, the GUI 300 may present a top portion 312 of a first composite image and a bottom portion 334 of a second composite image 330, along with a separation 320 between the two portions 312 and 334. This may be the case during the time when the top portion 312 is anchored and user swipes may be received to scroll through bottom portions as described in connection with FIG. 2. A user interaction may be received indicating that the combination of the top portion 312 and the bottom portion 334 may be of interest to the user (e.g., the user swipe may end, the user may release their finger from the touchscreen for a time duration exceeding a predefined time threshold, or some other user interaction depending on the input modality). The GUI 300 may then transition from presenting the combination of the top portion 312 and bottom portion 334 to presenting the second composite image 330. That transition may be presented as an overlay 340 over the second composite image 330. The overlay 340 may be presented for a predefined time period (e.g., for half a second) and may alter the presentation of the second composite image 330 during that time period (e.g., may increase the brightness, decrease the brightness, partially obscure the composite image 330, present a flash, etc.). In this way, the overlay 340 may provide a visual alert to the user about the transition to the composite image 330.

In the illustration of FIG. 3, the top portion 312 from the first composite image is used as an anchor, whereas bottom portions can change. This top portion 312 may be anchored around a particular point on the user's torso. For instance, the intersection between the shoulder line and the vertical center line of the body may be the anchoring point. When the bottom portion 334 from the second composite image 330 is presented, this bottom portion 334 may be aligned with the top portion 312, where the alignment may be relative to the anchoring point. For instance, the bottom portion 334 may be centered around the vertical center line running through the anchoring point. However, the overall presentation may show some offset between the top portion 312 and the bottom portion because these two portions belong to two different composite images and the alignment may not be a hundred percent accurate. In comparison, when the transition 340 is performed and the second composite image 330 is fully presented, no such offset would be presented because at that point the presented portions belong to the same composite image (e.g., the second composite image 330). Accordingly, the transition 340 may be used to hide this offset elimination or make it appear as subtle as possible such that it may not be obvious to the user that there are some alignment or offset differences before and after the transition 340.

Although FIGS. 1-3 describe the use of a particular application on a computing device (e.g., a looks application), the embodiments of the present disclosure are not limited to using a particular application on the computing device or to a single application. For instance, source images may be presented in an image gallery stored on the computing device. A user selection of a source image from the image gallery may trigger a presentation of an option to view composite images. If such an option is selected, composite images related to the selected source image may be presented. In another illustration, an intelligent personal assistant application may be running on the computing device. Upon a user natural language utterance to view composite images (or to view new outfit combinations), the intelligent personal assistant application may perform an API call to the looks application to retrieve the composite images.

In addition, the embodiments of the present disclosure are not limited to user interactions. For instance, the presentation of composite images can be automated by a script. In an illustration, the looks application may automatically trigger a presentation of new outfit combinations at preset time intervals (e.g., every morning at 7:00 am). The new composite images may be presented as a scripted slide show that automatically transitions between composite images. In yet another illustration, a notification may be sent, where the notification may include the scripted slide show. The notification may be an email message sent to an email address of the user, an application notification pushed to the looks application, and/or a script sent to another computing device of the user (e.g., a smart television or a smart display device suitable for presenting the composite images).

Figure 4:
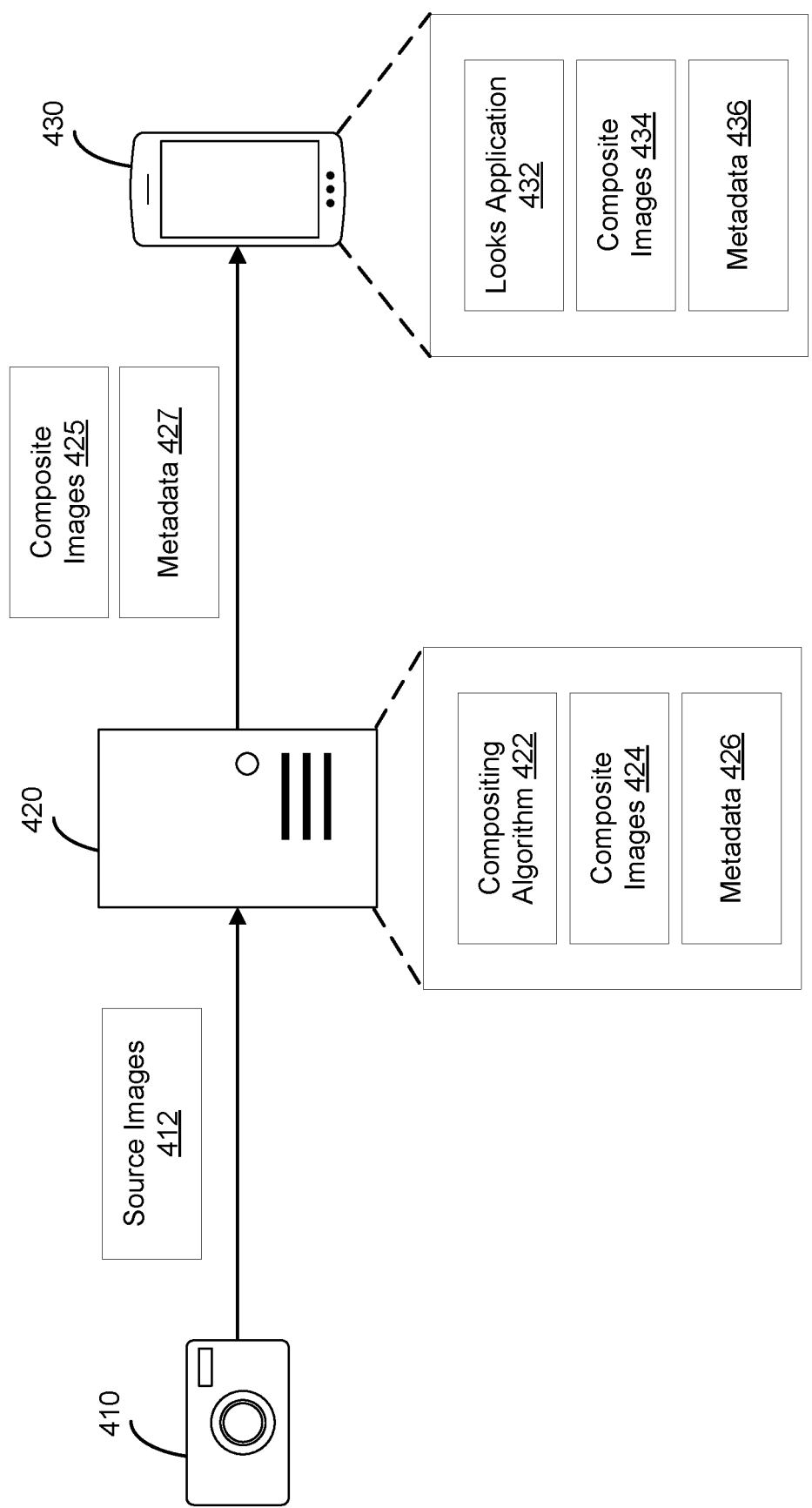
FIG. 4 illustrates an example of a system for providing composite images and associated metadata, according to embodiments of the present disclosure.

FIG. 4 illustrates an example of a system for providing composite images and associated metadata, according to embodiments of the present disclosure. As illustrated, the system may include an imaging device 410, a backend system 420, and a computing device 430. The imaging device 410 may generate and send source images 412 to the backend system 420. In turn, the backend system 420 may generate and send composite images 425 and associated metadata 427, along with the source images 412, as applicable to the computing device 430. The computing device 430 may execute a "looks application" that presents the received source images and the received composite images in a GUI, similarly to the presentation described herein above in connection with FIGS. 1-3.

The imaging device 410 may include a suitable set of optical sensors, processors, memories, and related software to generate the source images 412. In an example, the imaging device 410 may include a depth sensor. The imaging device 410 may be operated by the same user operating the computing device 430 and may be set-up at a location familiar to this user (e.g., in the user's house). Alternatively, the imaging device 410 may be operated by a different user, such as by a retail store operator that uses the imaging device 410 in support of retail operations. In yet another example device, the imaging device 410 may be integrated with the computing device 430. Each source image may show a user wearing an outfit in a predefined pose and/or at a predefined distance or field of view depth. Margins around the pose and/or depth may be predefined and used in the capturing the of the source images 412. The imaging device 410 may include or be coupled with a display device that presents a guidance to the user about capturing a source image. For instance, the guidance may be shown as a trace on GUI of the display device indicating a certain pose for the user. The imaging device 410 may detect that the user is standing in that pose and the detecting may trigger an automatic capture of a source image. Additionally or alternatively, the user may operate the imaging device 410 to trigger a manual capture.

Although the embodiments of the present disclosure are described in connection with source images showing outfits worn by a user, the embodiments are not limited as such. Instead, the embodiments similarly apply to source images showing other content. For instance, a source image may show a modeled outfit, where the modeling may be performed by another user or may be a graphical simulation based on a three dimensional human model corresponding to the user or to the other user. A source image may also be a stock image available from an online data store.

The backend system 420 may be communicatively coupled over one or more data networks with the imaging device 410 and the computing device 430. The backend system 430 may represent one or more servers or other computing resources hosted on hardware (e.g., virtual instances within a datacenter). The backend system 420 may host a software module that implements a compositing algorithm 422 to generate composite images 424 and associated metadata 426. The compositing algorithm 422 may detect clothing articles in source images, define corresponding portions in the source images that show these clothing articles, and combine portions from at least the different source images to generate a composite image. The metadata for that composite image may identify the shown clothing articles. A specific composting algorithm is further described in U.S. patent application Ser. No. 15/919,118, filed Mar. 12, 2018, entitled "Method And System For Generating Combined Images Utilizing Image Processing Of Multiple Images," which is hereby incorporated by reference in its entirety for all purposes.

In an example, the backend system 420 may store a user account associated with the computing device 430 and/or with the user of the computing device 430. When a source image is generated and is associated with the user account, the backend system 420 may store this image in a database in association with the user account. Over time, multiple source images may be stored for the user account. Upon receiving a new source image, the backend system 420 may input this new source image along with the existing source images to the compositing algorithm 422. The compositing algorithm 422 may detect the clothing articles and relevant portions from the new source image and may generate composite images, each of which combines at least one of the portions from the new source image with one or more portions from one or more of the other source images. The compositing algorithm 422 may also generate metadata for each of the generated composite images describing the portions (e.g., the clothing articles) shown in the composite images and the associations between the composite images (examples of the metadata are further described in the next figures). Hence, upon receipt of the new source image, the backend system 420 may generate new composite images 425 and new metadata 427, where each of the new composite images 425 combines at least one portion from the new source image with at least one portion from another existing source image and, thereby, show a new outfit combination.

The backend system 420 may send the composite images 425 and the metadata 427 to the computing device 430. In an example, the backend system 420 may push the metadata 427 to the computing device 430, thereby indicating to the computing device 430 that the new composite images 425 may be available. Upon an activation of the looks application 432 (e.g., an execution of this application 432 in the foreground or background of the computing device 430), the computing device 430 may send a request for the new composite images 425 to the backend system 420. In response, the backend system 420 may send the new composite images 425 to the computing device for local storage thereat.

Different techniques may be used to limit the number of the new composite images 425 (and the associated metadata 427) sent to the computing device 430. In this way, utilization of network bandwidth and memory storage may be improved. In one technique, the number may be limited based on the quality of the generated composite images. For instance, the compositing algorithm may output, in addition to a composite image, an image quality of the composite image. Composite images having image qualities less than a predefined threshold may be discarded and not sent to the computing device 430. Conversely, composite images having image qualities greater than the predefined threshold may be sent to the computing device 430. In another technique, a history of transmission of composite images during a predefined time period may be used. For instance, a maximum number of composite images may be transmitted within a one month period (this time period may be a rolling time window). When the new composite images 425 are generated, the backend system 420 may determine the number of already sent composite images within the time period. The backend system 420 may use the difference between the already sent number and the maximum number as an upper bound on the number of the new composite images 425 to send to the computing device 430. In a further technique, the number of the new composite images may be preset (e.g., hard coded, or defined in a user setting). For instance, the new source image may show a red shirt and blue jeans. The preset number may specify that a maximum of six composite images should be generated, where these composite images would show the red shirt and that a maximum of nine composite images should be generated, where these composite images would show the blue jeans. In yet another technique, the number of composite images may depend on a dapperness quality measurement of the new outfit combinations. For instance, the composting algorithm 422 may output, along a composite image showing an outfit combination, a dapperness score (e.g., a high score for a combination of a red shirt with blue jeans and a low score for a combination of a blue shirt and blue jeans). Composite images having dapperness score less than a predefined threshold may be discarded and not sent to the computing device 430. Conversely, composite images having dapperness scores greater than the predefined threshold may be sent to the computing device 430. In also another technique, the amount of the used memory storage on the computing device 430 may be considered. For instance, the looks application 432 may send data indicating how much memory space it has used on the computing device 430 and, optionally, how much memory space remains free on the computing device 430. The backend system 420 may then limit the number of the new composite images 425 to send as a function of the used space or remaining free space (e.g., to not use more than a difference between a maximum targeted memory space for the looks application 432 and the already used memory space, or to not use more than ten percent of the remaining free memory space).

The computing device 430 may be a user device suitable for executing the looks application 432 and presenting source images and composite images to the user. For example, the computing device 430 may be a smartphone, a tablet, a laptop, a desktop, or any other computing devices with suitable hardware, memory, and software. As illustrated, the computing device 430 may receive and store the new composite images 425 and the new metadata 427 from the backend system 420. Over time, the computing device 430 may store a library of a plurality of composite images 434 and their associated metadata 436 (along with source images). In this way, the looks application 432 may drive a GUI by using local images (e.g., source images and composite images from the computing device's 430 local memory), thereby providing a responsive and rich GUI experience.

Figure 5:
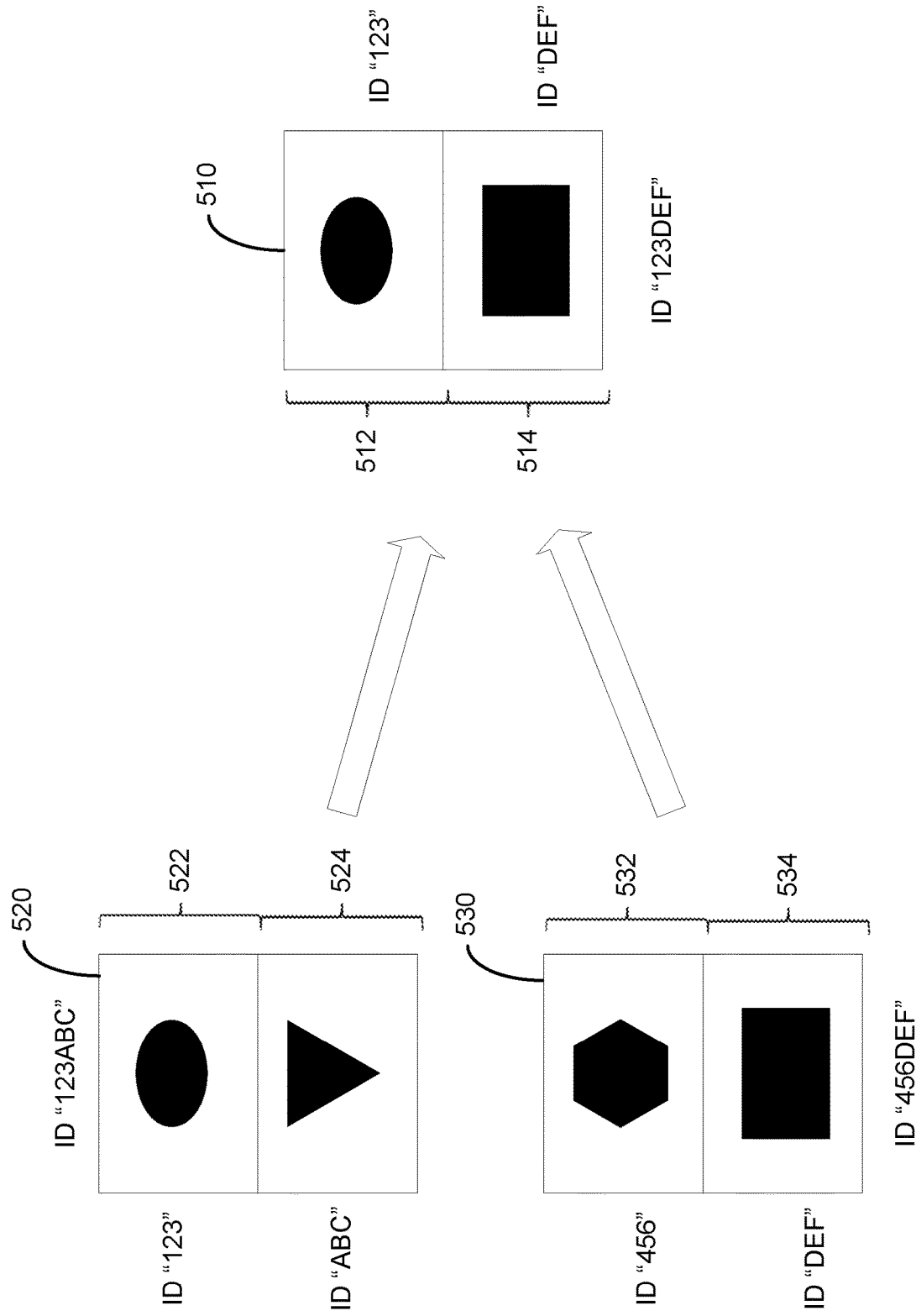
FIG. 5 illustrates an example of generating a composite image and associated metadata based on two image sources, according to embodiments of the present disclosure.

FIG. 5 illustrates an example of generating a composite image 510 and associated metadata based on two image sources 520 and 530, according to embodiments of the present disclosure. In the interest of clarity of explanation, each of the images is illustrated as containing a top portion and a bottom portion. However, the images may include a different number of portions and may be portioned in other ways (e.g., vertically, or following boundaries of objects, such as clothing articles, detected in each image). In addition, a composite image may be generated from more than two source images.

In an example, the first source image 520 may include a top portion 522 and a bottom portion 524. The top portion 522 may show a first object (illustrated with the ellipse), such as a first clothing article (e.g., a top such as a shirt). The bottom portion 524 may show a second object (illustrated with a triangle), such as a second clothing article (e.g., a bottom such as pants). The first object may have a first identifier (illustrated as ID "123") and the second object may have a second identifier (illustrated as ID "ABC"). The first source image 520 may also have an identifier, where this identifier can include a combination of the first identifier and the second identifier (illustrated as ID "123ABC"). The different identifiers may be stored in metadata of the first source image 520.

Similarly, the second source image 530 may include a top portion 532 and a bottom portion 534. The top portion 532 may show a second object (illustrated with the hexagon), such as a third clothing article (e.g., a top such as coat). The bottom portion 534 may show a fourth object (illustrated with a rectangle), such as a fourth clothing article (e.g., a bottom such as shorts). The third object may have a third identifier (illustrated as ID "456") and the fourth object may have a fourth identifier (illustrated as ID "DEF"). The second source image 530 may also have an identifier, where this identifier can include a combination of the second identifier and the fourth identifier (illustrated as ID "456DEF"). The different identifiers may be stored in metadata of the second source image 530.

As illustrated, the composite image 510 may be generated by combining the top portion 522 of the first source image 520 with the bottom portion of the second source image 522. The combining may include copying and blending these two portions. As a result, the composite image 510 may include a top portion 512 that corresponds to the top portion 522 of the first source image 520 and that shows the first object (illustrated with the ellipse). The composite image 510 may also include a bottom portion 514 that corresponds to the bottom portion 534 of the second source image 530 and that shows the fourth object (illustrated with the rectangle). In the example of a clothing combination, the composite image 510 would show the shirt in the top portion 512 and the shorts in the bottom portion 514.

The metadata of the source images 520 and 530 may be used to generate the metadata of the composite image 510. In particular, the metadata of the composite images 510 may identify the composite image 510 and the objects (e.g., the clothing articles) shown in its portions and, optionally, may identify the source images of these objects. For example, the metadata of the composite image 510 may include the first identifier (illustrated as ID "123") and fourth identifier (illustrated as ID "456"). The identifier of the composite image 510 may combine the first and fourth identifiers (illustrated as ID "123DEF").

In an example, the metadata is stored in the following data structure:
"composite image ID": "123DEF",
"image components":
{
"ID": "123",
"type": "top",
"source type": "source image"
"image source location": "device memory"
},
{
"ID": "DEF",
"type": "bottom",
"source type": "source image"
"image source location": "device memory"
}.

Although FIG. 5 illustrates a single composite image 510 being generated from the two source images 520 and 530, a plurality of composite images may be similarly generated. For instance, up to two composite images may be generated, each combining a single portion from each of the two source images. In addition to the described composite image 510 (illustrated as having ID "123DEF"), a second composite image may be generated and may have an ID "456ABC" by combining the bottom portion 524 of the first source image 520 with the top portion 532 of the second source image 530.

Figure 6:
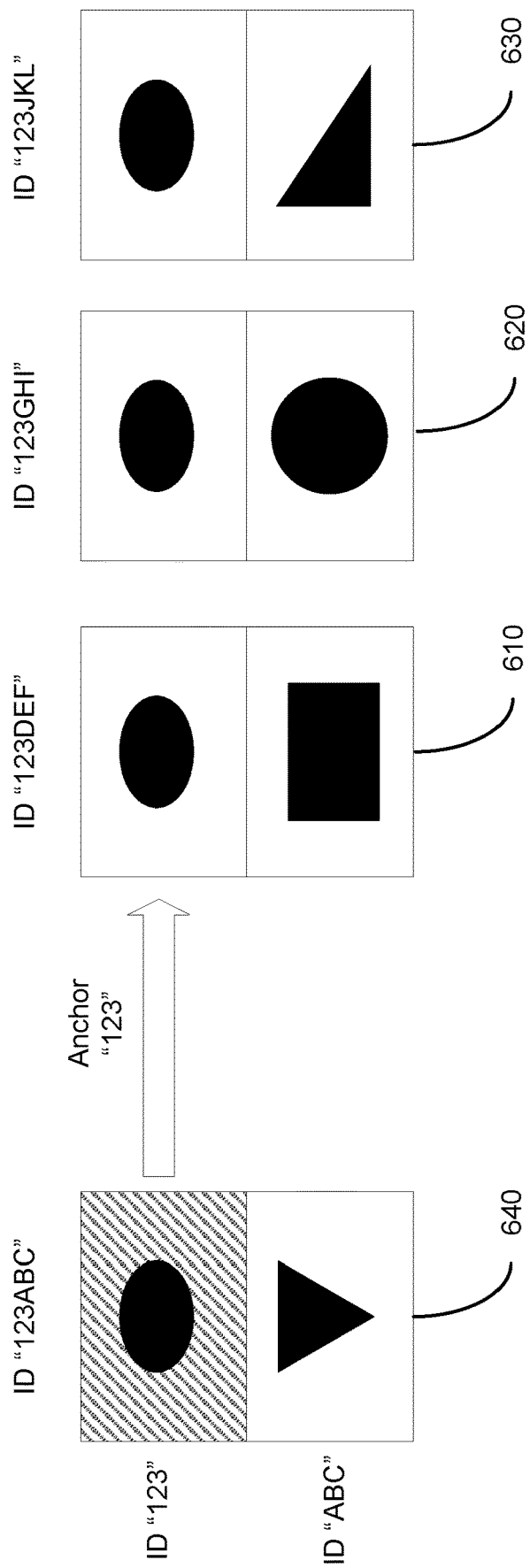
FIG. 6 illustrates an example of identifying composite images based on a source image, according to embodiments of the present disclosure.

FIG. 6 illustrates an example of identifying composite images 610-630 based on a source image 640, according to embodiments of the present disclosure. In the interest of clarity of explanation, FIG. 6 illustrates using a top portion of the source image 640 as an anchor and identifying three composite images 610-630 that have that same top portion. However, the bottom portion (or some other portion) of the source image 640 may be used as an anchor and/or a different number of composite images may be identified depending on their associations with the source image 640.

As illustrated, the source image 640 may include a top portion and a bottom portion The top portion may show a first object (illustrated with the ellipse), such as a first clothing article (e.g., a top such as a shirt). The bottom portion may show a second object (illustrated with a triangle), such as a second clothing article (e.g., a bottom such as pants). The first object may have a first identifier (illustrated as ID "123") and the second object may have a second identifier (illustrated as ID "ABC"). The source image 640 may also have an identifier, where this identifier can include a combination of the first identifier and the second identifier (illustrated as ID "123ABC"). The different identifiers may be stored in metadata of the source image 640.

Upon a presentation of the source image 640 in a GUI of a computing device, a user selection may be received to anchor its top portion (e.g., to use the shirt as an anchor for new outfit combinations that would include the shirt). Given that the top portion shows the first object with the ID "123," this first identifier may be used to look up a library of composite images stored on the computing device. The search may return, based on the metadata of the stored composite images, all composite images that include the first identifier (e.g., ID "123") in their top portions. As illustrated, the search result may include the first composite image 610 having an ID "123DEF" and showing the first object in its top portion and a third object in its bottom portion, the second composite image 620 having an ID "123GHI" and showing the first object in its top portion and a fourth object in its bottom portion, and the third composite image 630 having an ID "123JKL" and showing the first object in its top portion and a fifth object in its bottom portion. The search result may also organize the presentation of the three composite images 610-630 in a sequence, such as the first composite image 610 is presented first, followed by the presentation of the second composite image 620 upon a user scroll, and followed by the presentation of the third composite image 640 upon a further user scroll. In an example, this sequence-based organization may be defined in metadata also stored in the library, where this metadata was generated by a backend system at the time the composite images 610-630 were generated and sets the presentation order.

Accordingly, when upon setting the anchor, the GUI may be updated to present the first composite image 610. From that point on, user swipes would result in continuing the presentation of the top portion of the first composite image 610 that shows the first object, and scrolling in and out the bottom portions of the three composite images 610-630 showing the third, fourth, and fifth objects, as similarly described in connection with FIG. 2.

Figure 7:
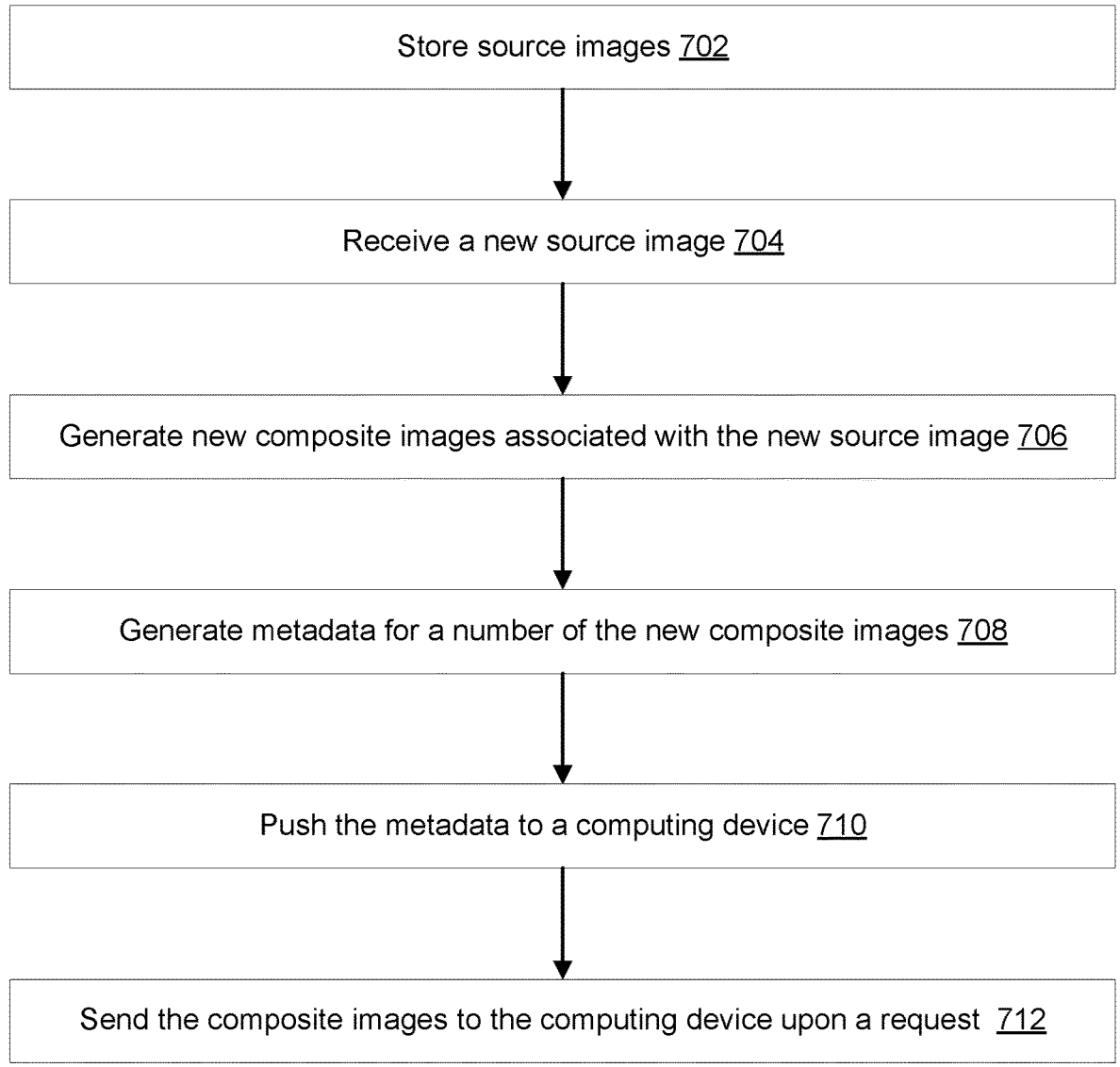
FIG. 7 illustrates an example flow for generating composite images and associated metadata, according to embodiments of the present disclosure.
Figure 8:
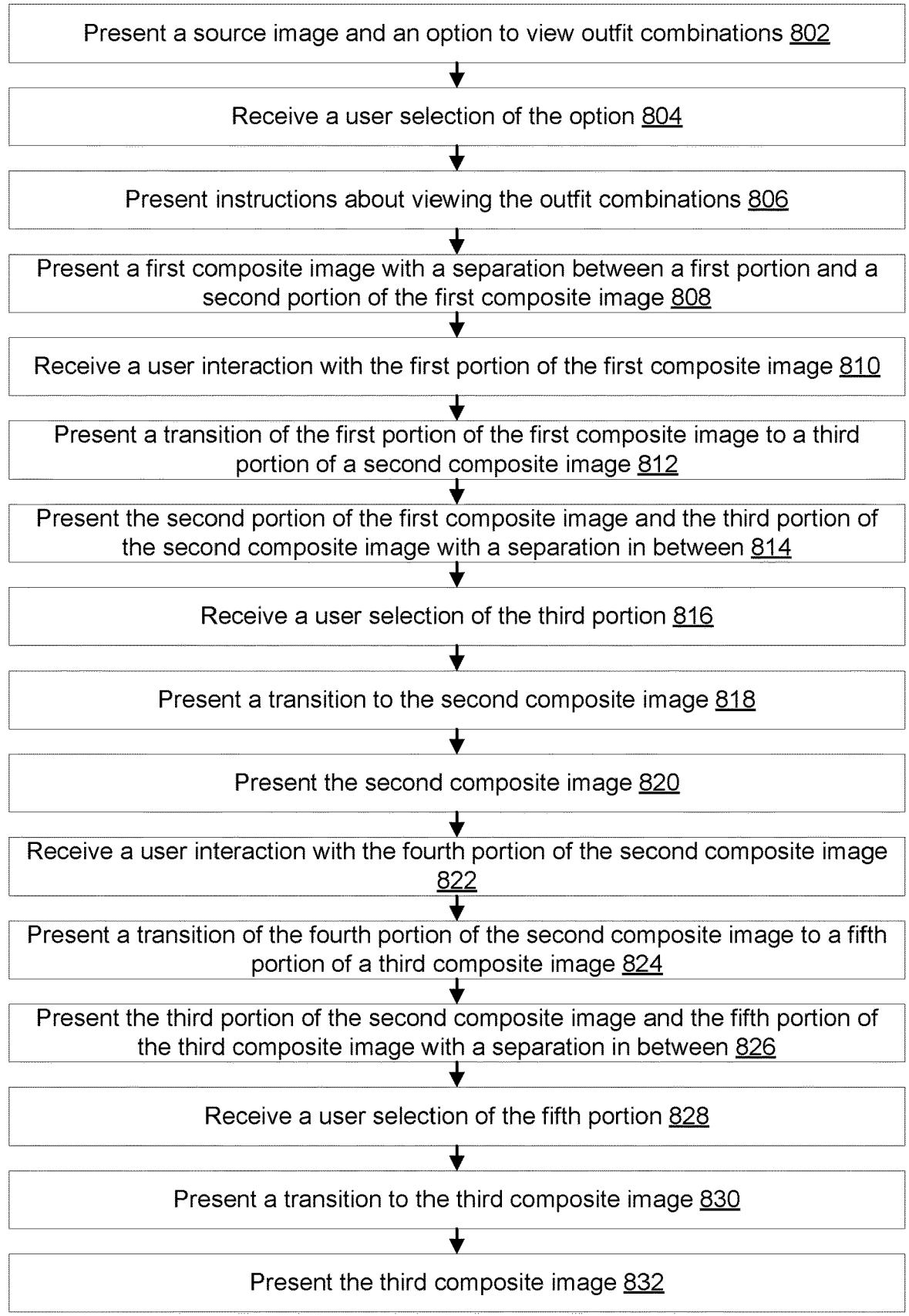
FIG. 8 illustrates an example flow for viewing composite images, according to embodiments of the present disclosure.
Figure 9:
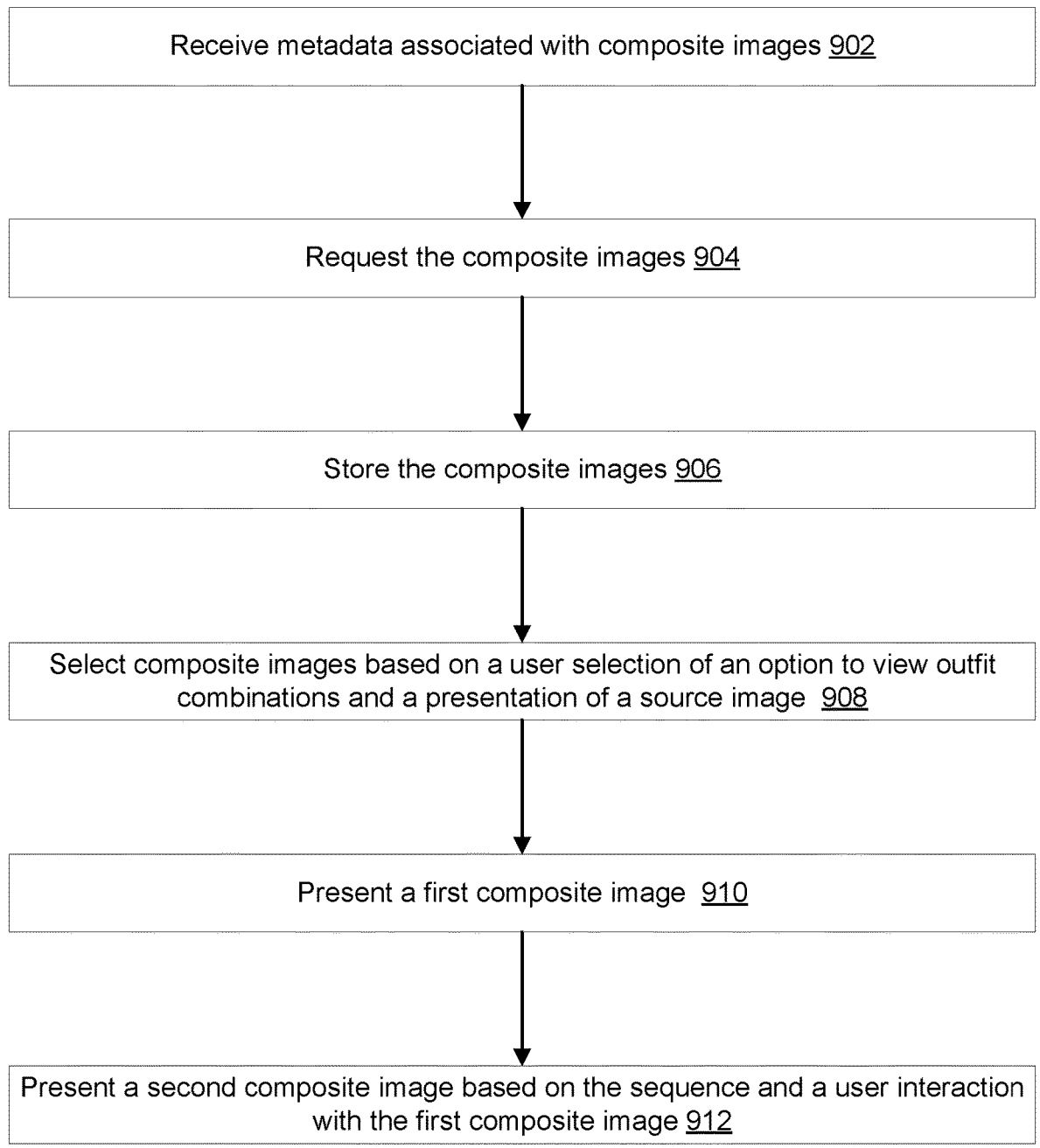
FIG. 9 illustrates an example flow for identifying composite images, according to embodiments of the present disclosure.

FIGS. 7-9 show illustrative flows for processing composite images, in accordance with various embodiments. Some or all of instructions for performing the operations of the illustrative flow can be implemented as hardware circuitry and/or stored as computer-readable instructions on a non-transitory computer-readable medium of a computer system, such as the system of FIG. 4. As implemented, the instructions represent modules that include circuitry or code executable by a processor(s) of the computer system. The use of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, and/or reordered.

FIG. 7 illustrates an example flow for generating composite images and associated metadata, according to embodiments of the present disclosure. The example flow may start at operation 702, where a backend system (e.g., the backend system 420 of FIG. 4) may store source images. The source images may be generated by an imaging device (e.g. the imaging device 410 of FIG. 4) that may be separate from or integrated with a computing device of a user (e.g. the computing device 430 of FIG. 4). The source images may be stored in association with a user account of the user and may show outfits worn by the user in a particular pose and a particular depth. The backend system may receive the source images as an upload from the imaging device and/or the computing device.

At operation 704, the backend system may receive a new source image. In an example, the backend system may receive the new source image as an upload from the imaging device and/or the computing device. Here also, the new source image may show a new outfit worn by the user in the particular pose at the particular depth. The new source image may include multiple portions, including a top portion showing a top of the new outfit (or some other first clothing article) and a bottom portion showing a bottom of the new outfit (or some other second clothing article).

At operation 706, the backend system may generate new composite images associated with the new source image. In an example, a new composite image includes the same number of portions, such as a top portion and a bottom portion. The backend system may generate a first composite image to include a copy of the top portion from the new source image and a copy of a bottom portion from another source image. Accordingly, this first composite image may show the same top from the new outfit and a different bottom from another worn outfit. Similarly, the backend system may generate a second composite image to include a copy of the bottom portion from the new source image and a copy of a top portion from another source image. Accordingly, this second composite image may show the same bottom from the new outfit and a different top from another worn outfit. This process may be repeated to generate additional composite images, each including either a copy of the top portion or the bottom portion from the new source image. The backend system may limit the number of composite images generated and/or stored. The limit can be set depending on a number of factors, as described in connection with FIG. 4, including an image quality, an allowed maximum number of composite images within a time period, a predefined target number, a dapperness score, a memory space, and the like. Accordingly, rather than generating all possible composite images that combine the top or bottom portions of the new source image, the backend system may generate a number of such composite images, where this number is limited based on one or more of the factors. Each of the generated new composite images may show an outfit combination that is not shown in an existing source image.

At operation 708, the backend system may generate metadata for the number of the new composite images. In an example, the backend system may generate two types of metadata. The first type may identify each clothing article shown in a new composite image and identify the new composite image by using a combination of the identifiers clothing articles as illustrated in connection with FIG. 5. The second type may organize the new composite images in sequences. In particular, all new composite images showing the top from the new source image may be organized in a first sequence. All new composite images showing the bottom from the new source image may be organized in a second sequence. The order of the composite images within a sequence may be random or may be set based on factors, such as image qualities, dapperness scores, and the like.

At operation 710, the backend system may push the metadata to the computing device. In an example, the metadata may be sent over a data network to the computing device for storage in local memory.

At operation 712, the backend system may send the composite images to the computing device upon a request from the computing device for the composite images. In an example, the computing device may send the request to the backend system based on an activation of a looks application executing on the computing device, where this application may determine that new composite images are available based on the metadata. Similarly to the factors described under operation 706, the backend system may limit the number of composite images sent to the computing device.

FIG. 8 illustrates an example flow for viewing composite images, according to embodiments of the present disclosure. The example flow may be performed by the computing device, where the composite images may be presented in a GUI on a display of the computing device.

The example flow may start at operation 802, where the computing device may present a source image and an option to view outfit combination. The source image may be available from local memory of the computing device and may have been generated by the imaging device. The source image may show an outfit previously worn by the user and may include multiple portions, including a top portion showing a top of the outfit (or a first clothing article) and a bottom portion showing a bottom of the outfit (or a second clothing article).

At operation 804, the computing device may receive a user selection of the option. In an example, the type of the user selection may depend on the input modality of the computing device. For instance, for a touchscreen modality, a finger tap over the presented option may be processed by the computing device as the user selection.

At operation 806, the computing device may present instructions about viewing the outfit combinations based on the user selection. The instructions may explain to the user how to interact with composite images to view the outfit combinations. For instance, the instructions may explain that swipes to the left or right over the bottom portion of the touchscreen may result in scrolls through bottom portions of composite images. The instructions may also explain that swipes to the left or right over the top portion of the touchscreen may result in scrolls through top portions of composite images.

At operation 808, the computing device may present a first composite image with a separation between a top portion (e.g., a first portion) and a bottom portion (e.g., a second portion) of the first composite image. In an example, the first composite image may be presented based on the user selection of the option. In this example, the instructions described in connection with operation 806 may be presented over the first composite image. The composite image may be associated with the source image. For instance, the first composite image may include a copy of the top portion of the source image or a copy of the bottom portion of the source image.

At operation 810, the computing device may receive a user interaction with the top portion (e.g., the first portion) of the first composite image. In an example, the type of the user interaction may depend on the input modality of the computing device. For instance, for the touchscreen modality, a user swipe over the top portion may be processed by the computing device as the user interaction to scroll through top portions of composite images associated with the source image, while anchoring the bottom portion of the first composite image. In the interest of clarity of explanation, the user interaction is described in connection with top portions. However, the example flows similarly apply to user interactions with bottom portions.

At operation 812, the computing device may present a transition of the top portion of the first composite image (e.g., the first portion) to a top portion of a second composite image (e.g., a third portion showing a third clothing article). In an example, the type of the user interaction may depend on the input modality of the computing device. For instance, for the touchscreen modality, the transition may be shown as a scroll between these two portions, while the bottom portion of the first composite image continues to be presented in the GUI.

At operation 814, the computing device may present the bottom portion of the first composite image (e.g., the second portion) and the top portion of the second composite image (e.g., the third portion). For instance, these two portions from the two different composite images may be presented simultaneously in the GUI with the separation between them at the end of the transition, where the bottom portion is presented in a corresponding bottom portion of the GUI and the top portion is presented in a corresponding top portion of the GUI, and where the separation is presented between these two portions in the GUI. In the interest of clarity of explanation, a single user interaction is described in connection with the flow. Nonetheless, operations 810-814 may be repeated across multiple composite images.

At operation 816, the computing device may receive a user selection of the top portion of the second composite image (e.g., the third portion). Generally, the user selection may indicate an interest of the user for an outfit combination that includes the third clothing article (as shown so far in the top portion of the second composite image) and the second clothing article (as shown so far in the bottom portion of the first composite image). In an example, the type of the user selection may depend on the input modality of the computing device. For instance, for the touchscreen modality, if the user swipe ends and no additional user swipe is detected for a predefined time period, this type of event may be processed by the computing device as the user selection.

At operation 818, the computing device may present a transition to the second composite image based on the user selection. The transition generally removes the separation between the portions shown in the GUI and replaces the bottom portion of the first composite image (e.g., the second portion showing the second clothing article) with an equivalent bottom portion of the second composite image (e.g., a fourth portion also showing the second clothing article). The transition may also provide a visual indication to the user that the second composite image is about to be presented in full in the GUI.

At operation 820, the computing device may present the second composite image. In an example, the top portion of the second composite image (e.g., the third portion) may be presented in the corresponding top portion of the GUI and the bottom portion of the second composite image (e.g., the fourth portion) may be presented in the corresponding bottom portion of the GUI. No separation between these two portions may be presented.

At operation 822, the computing device may receive a user interaction with the bottom portion of the second composite image (e.g., the fourth portion). This operation may be similar to operation 810, except that the user interaction is with a bottom portion rather than a top portion, thereby indicating that the top portion should be anchored.

At operation 824, the computing device may present a transition of the bottom portion of the second composite image (e.g., the fourth portion) to a bottom portion of a third composite image (e.g., a fifth portion) based on the user interaction. This operation may be similar to operation 812, except that the transition is between bottom portions and uses the third composite image that shows the same top portion as the second composite image.

At operation 826, the computing device may present the top portion of the second composite image (e.g., the third portion) and the bottom portion of the third composite image (e.g., the fifth portion) at the end of the transition. This operation may be similar to operation 814.

At operation 828, the computing device may receive a user selection of the bottom portion of the third composite image (e.g., the fifth portion). This operation may be similar to operation 816.

At operation 830, the computing device may present a transition to the third composite image based on the user selection. This operation may be similar to operation 814.

At operation 832, the computing device may present the third composite image. This operation may be similar to operation 820.

In addition to supporting the above presentations of and interactions with composite images, the computing device may also receive a user selection of a presented composite image. In response, the selected composite image may be stored in a virtual closet and/or may be shared over a social media feed.

FIG. 9 illustrates an example flow for identifying composite images, according to embodiments of the present disclosure. The example flow may be performed by the computing device to receive composite images from the backend system and to determine what composite images should be presented depending on a selected source image.

The example flow may start at operation 902, where the computing device may receive metadata associated with composite images. In an example, the metadata may be pushed from the backend system based on new composite images being generated by the backend system in response to a new source image received by the backend system.

At operation 904, the computing device may request the composite images. In an example, the received metadata may include identifiers of the composite images. The computing device may send a request to the backend system, where the request may include the identifiers.

At operation 906, the computing device may store the composite images. In an example, the computing device may receive the composite images from the backend system in response to the request. The received composite images may be stored in local memory of the computing device.

At operation 908, the computing device may select composite images based on a user selection of an option to view outfit combinations and a presentation of a source image. As described herein above in connection with operations 802-804 of FIG. 8, the source image and the option may be presented in the GUI and the user selection of the option may be received. In an example, the computing device may determine, from metadata of the source image, identifiers of clothing articles shown in the source images (e.g., a first identifier of a top and a second identifier of a bottom). The computing device may use the identifiers to look up the metadata of the composite images stored in its local memory. Matches between the identifiers from the metadata of the source image and metadata of the composite images may be used to return search results including a first set of the composite images that show the top (e.g., having the first identifier) and a second set of the composite images that show the bottom (e.g., having the second identifier). Further, each set may be organized in a sequence.

At operation 910, the computing device may present a first composite image. In an example, the computing device may select the first set to use in the presentation. The sequence for this set may identify that the first composite image should be presented first. Accordingly, the computing device may present the first composite image in the GUI. The presentation may also show the count of the composite images in the first set and the order of the first composite image (e.g., one out of nine).

At operation 912, the computing device may present a second composite image based on the sequence and a user interaction with the first composite image. In an example, upon a user swipe over the bottom portion of the first composite image, this bottom portion may be transitioned out and the bottom portion of the second composite image may be transitioned in as described herein above in connection with operations 822-826 of FIG. 8. The second composite image is selected to support the transition and presentation based on the sequence indicating that the second composite image is second in the sequence. Here also the presentation may show an updated count (e.g., two out of nine). Operation 912 may be repeated for other composite images in the sequence based on additional user interactions.

Figure 10:
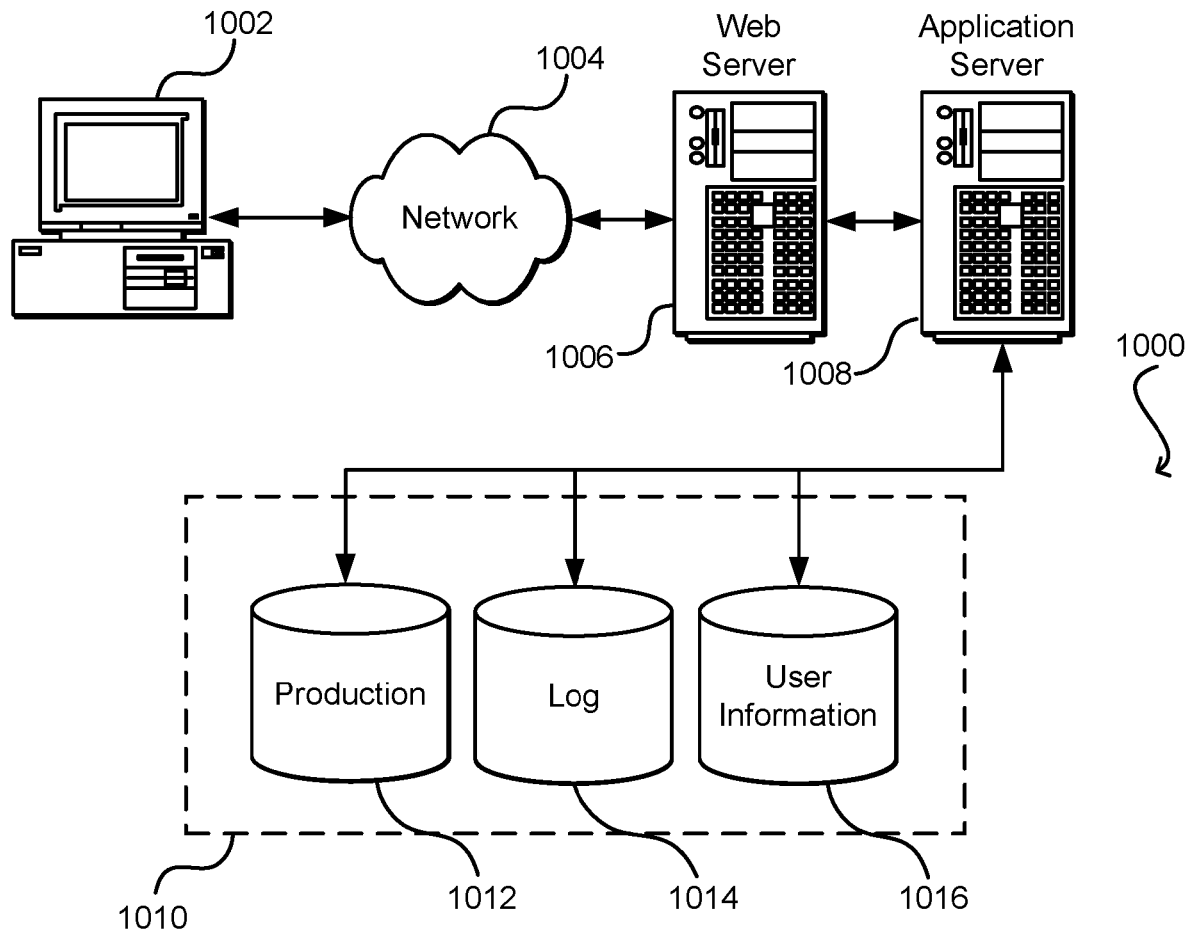
FIG. 10 illustrates an environment in which various embodiments can be implemented.

FIG. 10 illustrates an environment in which various embodiments can be implemented. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method implemented by a computing device, the method comprising:
    storing, in a memory of the computing device, source images that show outfits worn by a user, the source images generated by one or more imaging devices and comprising a first source image, a second source image, and a third source image, the first source image showing a first outfit that comprises a first top and a first bottom, the second source image showing a second outfit that comprises a second top and a second bottom, the third source image showing a third outfit that comprises a third top and a third bottom;
    storing, in the memory, composite images that are associated with the first source image and that show outfit combinations different from the outfits, the composite images comprising a first composite image and a second composite image, the first composite image generated based at least in part on the first source image and the second source image and showing the user wearing a first outfit combination that comprises the first top and the second bottom, the second composite image generated based at least in part on the first source image and the third source image showing the user wearing a second outfit combination that comprises the first top and the third bottom;
    presenting, in a user interface on a display of the computing device, the first source image and an option to view the outfit combinations;
    presenting, on the display based at least in part on a user selection of the option, the first composite image and instructions about user interactions to view the outfit combinations associated with the first source image, the first top shown in a first top portion of the first composite image, the second bottom shown in a first bottom portion of the first composite image;
    receiving a first user interaction with the first bottom portion of the first composite image, the first user interaction indicating a request for an outfit combination that comprises the first top;
    presenting, in the user interface based at least in part on the first user interaction, the first top portion of the first composite image, a second bottom portion of the second composite image, and a separation between the first top portion and the second bottom portion, the second bottom portion showing the third bottom;
    receiving a second user interaction indicating a selection of the third bottom; and presenting, in the user interface based at least in part on the second user interaction and by at least replacing the first top portion of the first composite image, the second composite image showing the first top and the third bottom.

2. The method of claim 1, wherein the separation comprises a line that divides the user interface in a top portion and a bottom portion, and wherein the first user interaction comprises a horizontal swipe over the bottom portion of the user interface.

3. The method of claim 1, wherein presenting the second bottom portion of the second composite image comprises identifying, in the second bottom portion, a number of available composite images that show the first top.

4. The method of claim 1, further comprising:
presenting, in the user interface, the first top in a second top portion of the second composite image, the third bottom in the second bottom portion of the second composite image, and a separation between the second top portion and the second bottom portion;
receiving a third user interaction with the second top portion, the third user interaction indicating a request for another outfit combination that comprises the third bottom; and
presenting, in the user interface based at least in part on the third user interaction, the second bottom portion of the second composite image, a third top portion of a third composite image showing a different top of clothing article, and a separation between the second bottom portion and the third top portion.

5. A computing device comprising:
one or more processors; and
one or more memories storing computer-readable instructions that, upon execution by the one or more processors, cause the computing device to:
present, in a user interface, image data and a first portion of a first composite image, the image data showing a first clothing article from a first source image, the first portion showing a second clothing article from a second source image, the first composite image showing a first outfit combination that combines the first clothing article in a second portion of the first composite image and the second clothing article in the first portion of the first composite image, the first composite image generated based at least in part on the first source image and the second source image;
present, in the user interface, the image data and a third portion of a second composite image, the third portion showing a third clothing article from a third source image, the second composite image showing a second outfit combination that combines the first clothing article in a fourth portion of the second composite image and the third clothing article in the third portion of the second composite image, the second composite image generated based at least in part on the first source image and the third source image;
determine a request associated with presenting the second composite image; and
present, in the user interface based at least in part on the request, the third portion and the fourth portion of the second composite image showing the second outfit combination.

6. The computing device of claim 5, wherein the one or more memories store further computer-readable instructions that, upon execution by the one or more processors, cause the computing device to store source images that show worn outfits, wherein the source images are generated by one or more imaging devices, and wherein composite images are generated by a server based at least in part on the source images.

7. The computing device of claim 6, wherein the one or more memories store further computer-readable instructions that, upon execution by the one or more processors, cause the computing device to store the composite images.

8. The computing device of claim 7, wherein the first clothing article has a first identifier, wherein the second clothing article has a second identifier, wherein the one or more memories store further computer-readable instructions that, upon execution by the one or more processors, cause the computing device to store metadata indicating that the first composite image comprises the first portion associated with the second identifier and the second portion associated with the first identifier, and wherein the first portion is presented based at least in part on the first clothing article being presented and on the metadata associating the first composite image with the first identifier of the first clothing article.

9. The computing device of claim 8, wherein the metadata further indicates a sequence for presenting the first composite image and the second composite image, and wherein the second portion of the second composite image is presented based at least in part on the sequence.

10. The computing device of claim 5, wherein the one or more memories store further computer-readable instructions that, upon execution by the one or more processors, cause the computing device to:
present, in the user interface, a source image and an option to view outfit combinations, wherein the source image is generated by an imaging device and shows the first article of clothing and a fourth article of clothing; and
receive a user selection of the option, wherein the image data and the first portion of the first composite image are presented along with a separation between the image data and the first portion based at least in part on the user selection.

11. The computing device of claim 10, wherein the image data is presented by presenting a fifth portion of a third composite image, wherein the fifth portion shows the first article of clothing, and wherein the separation divides the user interface between the fifth portion of the third composite image and the first portion of the first composite image.

12. The computing device of claim 5, wherein the one or more memories store further computer-readable instructions that, upon execution by the one or more processors, cause the computing device to present, prior to presenting the second composite image, a transition that indicates transitioning from the presentation of the first portion of the first composite image and the third portion of the second composite image to the presentation of the second composite image.

13. The computing device of claim 5, wherein the one or more memories store further computer-readable instructions that, upon execution by the one or more processors, cause the computing device to:
receive a user interaction indicating a request to change the image data; and
present, in the user interface, the third portion of the second composite image and a fifth portion of a third composite image, wherein the second portion shows the second clothing article, and wherein the fifth portion shows a third clothing article.

14. A computer system comprising:
one or more servers configured to generate composite images from source images; and
a computing device communicatively coupled with the one or more servers and configured to:
receive a number of the composite images;
present, in a user interface, image data and a first portion of a first composite image, the image data showing a first clothing article from a first source image, the first portion showing a second clothing article from a second source image, the first composite image showing a first outfit combination that combines the first clothing article in a second portion of the first composite image and the second clothing article in the first portion of the first composite image, the first composite image generated based at least in part on the first source image and the second source image;
present, in the user interface, the image data and a third portion of a second composite image, the third portion showing a third clothing article from a third source image, the second composite image showing a second outfit combination that combines the first clothing article in a fourth portion of the second composite image and the third clothing article in the third portion of the second composite image, the second composite image generated based at least in part on the first source image and the third source image;
determine a request associated with presenting the second composite image; and
present, in the user interface based at least in part on the request, the third portion and the fourth portion of the second composite image showing the second outfit combination.

15. The computer system of claim 14, wherein the computing device is further configured to receive metadata from the one or more servers, wherein the metadata comprises an identifier of the first composite image and associates the first composite image with the first article of clothing and the second article of clothing.

16. The computer system of claim 15, wherein the metadata further indicates a sequence for presenting the composite images based on the presentation of the first article of clothing.

17. The computer system of claim 15, wherein the server is configured to:
receive the first source image and the second source image generated by an imaging device;
generate the first composite image based at least in part on the first image source and the second image source; and
generate the metadata that includes an identifier of the first composite image and an association between the identifier and a first identifier of the first clothing article and a second identifier of the second clothing article.

18. The computer system of claim 15, wherein the computing device is further configured to:
receive the metadata in a push from the one or more servers; and
request the first composite image and the second composite image from the server based at least in part on the metadata.

19. The computer system of claim 14, wherein the number of the composite images is based at least in part on one or more of: image qualities of the composite images or a maximum number of composite images to send to the computing device in a time period.

20. The computer system of claim 14, wherein the first composite image is generated based at least in part on the first source image and the second source image from a virtual closet, and wherein the computing device is further configured to associate the second composite image with the virtual closet based at least in part on the request.

* * * * *